(12) United States Patent
Olaya

(10) Patent No.: US 8,462,409 B2
(45) Date of Patent: Jun. 11, 2013

(54) OPTICAL WAVE CORRECTION FOR A HOLOGRAPHIC PROJECTION SYSTEM

(75) Inventor: Jean-Christophe Olaya, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 904 days.

(21) Appl. No.: 12/525,436

(22) PCT Filed: Jan. 30, 2008

(86) PCT No.: PCT/EP2008/051125
§ 371 (c)(1),
(2), (4) Date: Oct. 20, 2009

(87) PCT Pub. No.: WO2008/092892
PCT Pub. Date: Aug. 7, 2008

(65) Prior Publication Data
US 2010/0033782 A1      Feb. 11, 2010

(30) Foreign Application Priority Data
Jan. 31, 2007   (DE) .......................... 10 2007 005 823

(51) Int. Cl.
*G03H 1/22* (2006.01)
(52) U.S. Cl.
USPC ............................................. 359/32; 348/40
(58) Field of Classification Search
None
See application file for complete search history.

(56) References Cited

FOREIGN PATENT DOCUMENTS

| | | |
|---|---|---|
| DE | 102 97 383 T5 | 8/2004 |
| DE | 10 2005 023 743 | 11/2006 |
| WO | WO 99/06856 | 2/1999 |
| WO | WO 02/39192 | 5/2002 |
| WO | WO 2004/044659 | 5/2004 |
| WO | WO 2006/119760 | 11/2006 |
| WO | WO 2006/119920 | 11/2006 |
| WO | WO 2007/099458 | 9/2007 |
| WO | WO 2008/031707 | 3/2008 |

OTHER PUBLICATIONS

International Search Report, dated May 27, 2008, issued in priority International Application No. PCT/EP2008/051125 (in both German and English).
Fukaya et al., "Improved Electroholographic Display Using Liquid Crystal Devices to Shorten the Viewing Distance with Both-Eye Observation," Optical Engineering, Soc. of Photo-Optical Instrumentation Engineers, No. 35(6), pp. 1545-1549 (Jun. 1996).
Fukay et al., "Eye-Position Tracking Type Electro-Holographic Display Using Liquid Crystal Device," Asia Display 1995, pp. 963-964, XP002940561.

*Primary Examiner* — Derek S Chapel
(74) *Attorney, Agent, or Firm* — Saul Ewing LLP

(57) ABSTRACT

A holographic projection system with an optical wave tracking system sets the propagation direction of a modulated wave uses a position control system and an eye finder. It provides an adjustable optical wave correction system which compensates for deformations of the wave which are dependent on the current eye position. Largely dynamic changes and deformations in the form structure of the modulated and conditioned wave are reduced, which result from changes in the propagation direction of the aligned, optically enlarged and modulated wave on a focusing display screen. The optical wave correction system includes adjustable wave form means and computer means which set the optical behavior of the wave form means using the positional data from the current eye position. The adjustable wave form means are located in the light path between an illuminating system for the spatial light modulation means and the display screen of the projection system.

13 Claims, 3 Drawing Sheets

OPTICAL WAVE CORRECTION FOR A HOLOGRAPHIC PROJECTION SYSTEM

CROSS REFERENCE TO RELATED APPLICATIONS

Figure 1A:
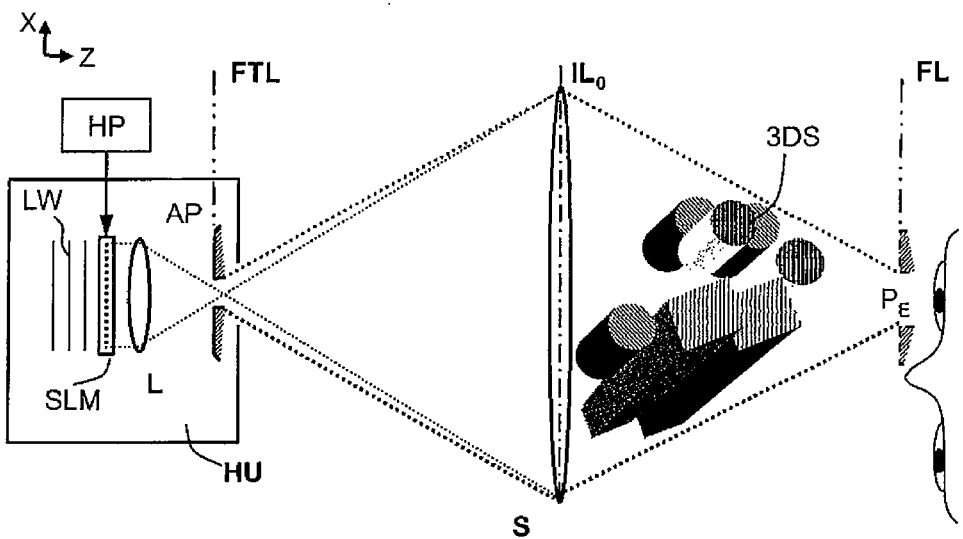

This application claims the priority of PCT/EP2008/051125, filed on Jan. 30, 2008, which claims priority to German Application No. 10 2007 005 823.5, filed Jan. 31, 2007, the entire contents of which are hereby incorporated in total by reference.

FIELD OF APPLICATION OF THE INVENTION

This invention relates to an optical wave correction to be used in a holographic projection system with optical wave tracking means, which controls the direction in which a modulated wave propagates and exits the system in order to holographically reconstruct three-dimensional scenes. The projection system uses a position controller and an eye finder. If an observer changes his position while watching the holographic reconstruction, these elements direct the modulated wave at the observer eyes such that the reconstruction is visible in an error-free manner at least for one observer eye, irrespective of the current eye position. Such a projection system requires a multitude of optical means, which affect the quality of the modulated wave at the point of exit from the system, and which may also impair that quality as they may cause errors in the propagation of the modulated wave, such as aberrations. This invention relates in particular to optical means which compensate such effects.

The invention is independent of the way the original holographic information is provided, it can thus be applied in many types of projection systems, and it can also be used in systems which allow multiple observers to watch holographically reconstructed video scenes simultaneously.

TECHNICAL BACKGROUND OF THE INVENTION

A holographic projection system in the sense of this invention holographically represents preferably moving three-dimensional scenes in real-time with the help of video means and comprises discretely controllable spatial light modulator means, which are encoded with a sequence of video holograms by a hologram processor such that they spatially modulate waves of light which are capable of generating interference with holographic information. The modulated light waves reconstruct object light points in a reconstruction space outside the projection system, in front of the eyes of observers, through local interferences, where said object light points optically reconstruct the desired three-dimensional scene. Reconstructed object light waves which represent the entirety of all object light points propagate in a directed manner towards the eye positions of at least one observer, so that one or multiple observers can watch those object light points in the form of the scene. This means that in contrast to a stereoscopic representation, a holographic representation realises a substitution of the object.

In order to achieve a satisfying quality of holographic representations, the observers should also be able to watch a reconstruction in a sufficiently large range of vision. Consequently, the reconstruction space must be as large as possible, and the size of a holographically reconstructed scene should be at least 50 cm in diagonal, similar to TV and video representations.

A known problem in a reconstruction system is an undisturbed propagation of the required light waves prior to generating interference. In order to reconstruct the object light points at the correct position in space, and with the correct light point values, at least a part of the interfering light waves must arrive simultaneously at all the positions at which object light points are to be reconstructed through interference. This means that spatial coherence is required among as many as possible of the interfering light waves at each desired object light point.

Moreover, the wave lengths of the light waves which contribute to an interference point must not exhibit any uncontrolled path length differences among one another as caused by controllable optical means.

In the description below, the term 'optical axis' denotes a straight line which coincides with the axis of symmetry of a reflecting or refracting optical element. Spatial light modulator means, which have been encoded by a hologram processor with holographic information of a three-dimensional scene, represent a 'video hologram'. The interaction of a video hologram which is illuminated with coherent light with imaging means causes a 'modulated wave' to be generated. The modulated wave is a three-dimensional light distribution, which propagates in the form of a Fourier transform of the video hologram towards the eye position, thus reconstructing the scene by way of interference. The imaging means define a 'direction of propagation' of the modulated wave. This direction of propagation can be modified by 'optical wave tracking means'. If optical elements are disposed on the way to or if their effective direction is towards the video hologram, they will be referred to as 'hologram-side', and if they are disposed on the way to or if their effective direction is towards an eye position of an observer eye, they will be referred to as 'observer-side'. A 'visibility region' describes a space which is disposed on the observer side at an eye position as the exit pupil of the system, and in which at least one observer eye must be situated for observing a holographically reconstructed scene. If, as is the case in the present application, the projection system includes an optical wave tracking means for tracking the modulated wave to the current eye position, the 'tracking range' defines the space which embraces all eye positions for which wave tracking is possible. In the technical literature on the subject, such a projection system is also known as a projection system with eye tracking device.

In the international publication WO 2004/044659, titled "Video hologram and device for reconstructing video holograms", the applicant of this invention has already disclosed a holographic reconstruction system which describes one possibility of tracking holographic reconstructions.

In that reconstruction system, a wave is modulated with holographic information by spatial light modulator means. The modulated wave reconstructs by way of interference the three-dimensional scene in a virtual reconstruction space outside the holographic system, said reconstruction space being positioned in front of one or both eyes of one or multiple observers. For this, the modulated wave exits the reconstruction system at its observer side through the spatial light modulator means. In order to achieve a wide viewing range, the surface area of the exit pupil of the system should be as large as possible. In order to efficiently utilise the resolution of the light modulator means, focussing means can then again be used to reduce the size of the reconstruction space near the eye to the dimensions of an eye pupil, so that the reconstruction space preferably has the shape of a frustum with an apex angle which is as large as possible, in order to be able to show large objects of a three-dimensional scene in their entirety as the distance between the observer to the reconstruction increases. A visibility region, in which at least one eye of an observer must be positioned for observing the reconstruction, begins at an eye position at the observer-side end of the reconstruction space, in the Fourier plane of the focussing optical system. The illumination device of the spatial light modulator means is imaged in this region, which also used to be referred to as the observer window in many of our previous applications.

The reconstruction space, which is frustum-shaped due to the focussing, causes problems with the visibility of the three-dimensional reconstruction, if the observer eye is not fully situated inside the visibility region. Already a slight lateral movement of the observer may cause effects such as disappearance of visibility, vignetting or distortion of the spatial frequency spectrum. Moreover, the borders of the reconstruction space are difficult to find for an observer whose eyes are situated outside the visibility region. This is why the exit direction of the wave is preferably adapted together with the virtual reconstruction space to the new eye position if an observer moves. To achieve this, the holographic reconstruction system can displace the entire illumination device of the light modulator means or individual parts thereof.

Document "Eye-Position Tracking Type Electro-Holographic Display Using Liquid Crystal Device", N. Fukay et al., published in Asia Display 1995, pp. 963-964, XP002940561, describes another optical tracking means for tracking holographic reconstructions. Two small spatial light modulators each generate in a spatially multiplexed process a modulated wave, in order to provide a reconstruction for each eye position of an observer. A vertically and horizontally turnable tracking mirror is disposed in the centre of the reconstruction, i.e. outside the holographic display, or more specifically between the display panel and the observer. The system thus generates in parallel two small observer zones, which can be tracked on a truncated circular path around the reconstruction, so as to follow the lateral movements of an observer. Besides the external position of that tracking mirror, another disadvantage is that the observer's viewing direction is crosswise due to the deflection from the mirror, and that it is substantially limited to the side segments along the circular path. The reconstruction system compensates longitudinal movements of the eye position by way of displacing the illumination device of the light modulator, as in the former solution.

The international publication WO 1999/06856, titled "Microscope with adaptive optics", discloses an adaptively controllable optical system. A wave front modulator for modifying a light wave such as to move the focus within the object space without changing the axial distance between object and objective lens is disposed between eyepiece lens and objective lens in the optical observation and illumination path of a microscope. The wave front modulator realises a phase modulation and thereby deforms the image wave front spherically in the pupil plane of the objective lens, or in a plane which is equivalent to the pupil plane. Further, the optical system is able to correct the wave front which is curved due to the effects of the objective lens by way of accordingly locally adapted modulator adjustments.

The optical system for wave front modulation can be of a reflective type, for example using electrically controlled deformable mirrors, or of a transmissive type, for example using an LCD panel. The optical system can also comprise discretely movable segments, which are controllable so as to compensate local aberrations in the wave front. The focus location in the object is axially displaced by way of spherical modification of the wave front, and the wave front is tilted due to a lateral displacement. The adaptive optical system must be controllable in segments in order to be able to correct angle-specific aberrations. Alternatively, two independent modulators are used which are disposed in different pupil planes. All manipulations are performed in a pupil plane of the optical path.

The international publication WO 2006/119760 filed by the applicant, titled "Projection device and method for the holographic reconstruction of scenes", describes a holographic projection system in which a plane light wave LW illuminates the entire surface of a spatial light modulator with light which is capable of generating interference. A hologram processor HP dynamically encodes the light modulator with holographic information of a desired three-dimensional scene. The encoded modulator thus represents a dynamic video hologram. The light modulator can work in a transmissive mode, i.e. modulate a wave which is capable of generating interference as it passes through the modulator, or it can serve as a controllable reflector.

Because knowledge of the functional principle of a projection system is essential for understanding the present invention, an exemplary projection system will be described now with reference to FIG. 1. However, the inventive idea can also be realised with the help of other projection systems.

An optical projection system L in a holographic unit HU images a video hologram which is encoded on the spatial light modulator SLM in an enlarged manner into an image plane which coincides with a focussing display screen S. A spatial frequency spectrum of the video hologram is thereby formed in the image-side focal plane of the optical projection system L, the Fourier plane FTL. Because of their matrix arrangement, the modulator cells modulate the wave spatially and equidistantly. As a result, multiple diffraction orders are created in the Fourier plane FTL, which lie at different positions in a periodic spatial sequence. The focussing display screen S would image all diffraction orders into its focal plane, and an observer would see them with an eye outside the visibility region, i.e. the other eye that is not provided with the content of the video hologram. A spatial frequency filter AP disposed in the Fourier plane FTL prevents this as it selects one diffraction order. The focussing display screen S thus only images the desired diffraction order of the modulated wave into its focal plane FL in front of an eye position $P_{E0}$. An observer can watch the reconstructed three-dimensional scene 3DS behind the eye position $P_{E0}$.

In the example shown in FIG. 1a, the display screen S is a lens. As explained above, the diameter of the display screen should be very large compared with the optical projection system L. The display screen S is therefore preferably a concave mirror.

The video holograms are encoded such that the reconstruction is only performed when the enlarged and focussed wave has left the system through the display screen S.

However, the reconstruction 3DS is fixed in the reconstruction space in this system too, so that it will only be visible if at least one eye of the observer is situated directly in the visibility region behind the eye position $P_{E0}$, which is not physically visible. Unlimited mobility in front of the system without loss or restriction of visibility of the reconstruction 3DS will again only be possible if an additional wave tracking means is used.

Figure 1B:
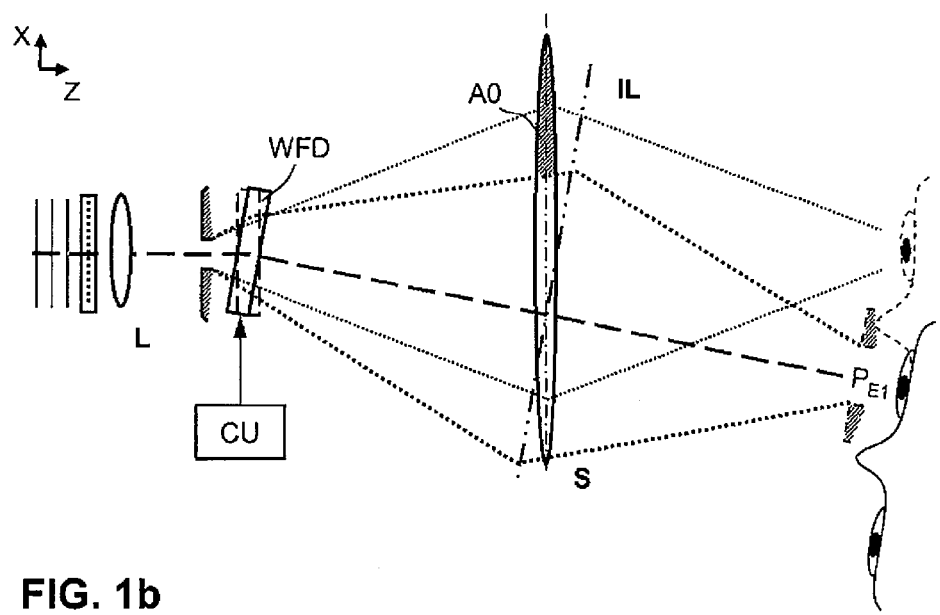

If the reconstructed scene is to be visible without any restrictions when the observer moves, a position controller CU must track the optical path of the entire modulated wave with the help of optical wave tracking means WFD to the respective observer eye such that the end of the reconstruction space is always close to the respective observer eye $P_{E1}$, as shown in FIG. 1b. For this, the exemplary projection system comprises an eye finder, known as such, which detects the current positions of the observer eyes and which controls with the help of the position controller CU the optical path of the modulated wave such that the latter is directed at the current eye position $P_{E1}$. In a system which provides a specific wave for each observer eye, the desired eye position is the position behind which the observer eye that corresponds with the currently encoded video hologram is situated. The video hologram must not be visible at the other eye position.

Because the enlarged modulated wave always only exits the reconstruction system through a limited section of the display screen S, due to the inclination of the optical axis towards an eye position $P_{E1}$, the display screen S has to be much larger, as can be seen in FIG. 1b. A large section A0 of the display screen S, which varies according to the moving eye position, then always remains unused. Such a solution would be rather difficult and costly and not very convenient in practical use.

It becomes clear from the above explanations that the visibility region in the sense of the present patent application is an image of the filtered spatial frequency spectrum of the video holograms in front of at least one observer eye. The size of this region depends on both the distance between individual modulator cells, i.e. the pitch of the light modulator, and on the focal length of the entire optical system and the optical path length of the light used for reconstruction. The latter two relations are of importance in the context of the present invention. They have the effect that the properties of the desired reconstruction, such as visibility and size, depend on all optical parameters which affect the focal length of the entire optical system and the path length of the modulated wave, in particular in the form of distortion of parts of the wave.

Because the optical wave tracking means in the present projection system are disposed inside the system, the direction of propagation of the modulated wave is not identical to the screen axis for various angles of incidence, which depend on the eye position $P_E$. Depending on the desired working range of wave tracking, this deviation may be in the range of about ±5 degrees around the screen normal, i.e. far beyond the aberration-free region, also known as the Gaussian region. This means that a projection system with optical tracking of the modulated wave greatly departs from the conditions required for perfect imaging of a spatially expanding modulated wave.

A changing direction of propagation of the modulated wave when exiting the optical system has the effect that the display screen biases the spatial structure of the exiting wave, also including aberration portions which depend on the actual direction of propagation. An optically widened wave which impinges on a large focussing display screen is particularly sensitive to aberrations, such as spherical aberration, coma, field curvature, astigmatism and distortion. Aberrations which depend mainly on the field size, i.e. field aberrations, fluctuating portions of which interfere if the eye positions are extremely distant, are particularly disturbing. Depending on the eye position, aberrations of various strengths may also appear in vertical and horizontal direction. Because according to the present holographic reconstruction principle with a focussing display screen the reconstruction can only be realised with an image of the diffraction order of the video holograms which has been selected by the spatial frequency filter, system-specific aberrations of the wave prior to the reconstruction may cause substantial damage as the angle of incidence increases.

Because the described projection system also takes advantage of a special encoding of the light modulator means, which prevents diffraction orders from overlapping with the help of realisable spatial light modulators, field aberrations, hitherto unknown in conventional projection systems, also occur when reconstructing certain object light points of a scene. In this particular case, the hologram processor only encodes each hologram point on the light modulator means in a limited region of the hologram. As a result, object points which are encoded in marginal hologram regions, are affected differently by aberrations than those object light points which are encoded near the axis. The aberrations and vignetting thereby occurring depend greatly on the eye position at which the modulated wave is to be directed. As a consequence, certain object points are not at all reconstructed or in a wrong spatial depth, or individual object points do not appear within the visibility region. This is why measures must be taken to ensure that light waves from the marginal regions of the display screen reach the visibility region for each eye position and that they reconstruct the object light points in the correct spatial depth. More details on the encoding of a reconstruction system with a focussing display screen have been disclosed by the applicant in the international publication WO 2006/119920.

Also if colour video holograms are reconstructed, light waves of different length cause in the lenses inside the system a dependence of the refractive index on the wavelength, also known as dispersion. This dispersion leads to chromatic aberrations of the primary colours required for colour synthesis of the video hologram, which are perceived by an observer mainly in the form of different sizes and positions of the visibility region.

A projection system including wave tracking with at least one movable mirror in front of the display screen thus has the effect of a more or less distinct position-specific change in the geometry of the exiting wave with each shift in direction of the wave which results from a position change of an observer on the one hand, and from time-division multiplexed switching between the positions of different eyes on the other. For certain exposed eye positions, this change in geometry can be so grave that a satisfactory reconstruction of the scene becomes impossible. Means for correcting the wave form are thus desired which realise a specific correction of the wave form for each eye position of an observer within a desired tracking range and for each primary colour so that the wave has constant geometric and optical properties. In the present case, the optical wave correction must be capable of being switched between different correction settings at very high speed, in particular in a projection system which switches between the positions of different eyes in a time-division multiplexed process.

Because in a desired large tracking range, the cumulative aberrations can vary greatly among individual eye positions, caused by the interaction of many different interfering aberrations, aberration correction with the help of fixed optical means is not possible.

SUMMARY OF THE INVENTION

The invention is based on a holographic reconstruction system where spatial light modulator means which are encoded with sequences of video holograms modulate a wave which is capable of generating interference with holographic information. The modulated wave corresponds to at least one eye of an observer and contains holographic information for reconstructing preferably three-dimensional scenes. The reconstruction appears outside the reconstruction system, on the observer side, in front of a display screen.

Further, imaging means for imaging the video holograms and a position controller for optical wave tracking are additionally disposed inside the system. Wave tracking means adjust the direction of propagation of the modulated wave according to the current eye position of the observer eye to which the modulated wave corresponds. The position controller uses position information which describes current eye positions to control the wave tracking means dynamically such that the direction of propagation of the modulated wave follows the observer eye during each position change of an observer within the desired tracking range.

For an application in a projection system, as disclosed in the international publication WO 2006/119760, the display screen must focus the modulated wave, so that the desired holographic reconstruction appears in the reconstruction space between the display screen and the image-side focal point of the system.

Summarising, the object of the invention is to provide for a holographic projection system with optical wave tracking, that is realised independent of the current eye position, a controllable optical wave correction which can be controlled in real-time with the help of computing means. In the present application, the term 'real-time' means at the same hologram frequency at which the system provides video holograms for different eye positions. In addition to general aberrations, the wave correction shall further reduce as far as possible dynamic changes and deformations in the form structure of the modulated and processed wave, which result mainly from changes in the direction of propagation of the directed, optically enlarged and modulated wave effected by the focussing display screen.

Further, the wave correction shall support quick position changes between extremely distant positions within a tracking range, which is as large as possible, together with the wave tracking device. The reconstructed scene shall be visible without errors and in a constant quality from any possible eye position within the desired tracking range.

According to the invention, the optical wave correction comprises controllable wave forming means and computing means which control the optical behaviour of the wave forming means based on position information which describes the current eye position. The controllable wave forming means are disposed in the optical path between an illumination device for the spatial light modulator means and the display screen of the projection system. Based on position information which describes the desired eye positions, computing means compute for each eye position which is controlled by the wave tracking device, wave forming means control data which modify at least the phase control and the direction control of the wave forming means such that the reconstructed three-dimensional scene which is perceived behind the eye position always has the same representation geometry and optical quality of the original scene, if possible, irrespective of the current eye position. The same representation geometry means that the system reconstructs the light points which are visible from the observer eye as precisely as possible as regards their spatial position, with identical distances in a reconstruction space which lies each observer eye.

Generally, the wave form can already be modified at the location where the wave is modulated with holographic information. Conventional spatial light modulator means of a holographic projection system, which modulate the phase of a light wave which is capable of generating interference with the holographic information of the desired three-dimensional scene, have a very good resolution so that they can give any individual portion of a light wave an individually structured corrective form for compensation already before the modulated wave is biased caused by aberrations in the optical system. For this, the spatial light modulator means which contain holographic information are at least partly also capable of forming a wave. In this special case of wave correction, the computing means encode the spatial light modulator means with hologram values which contain, in addition to the holographic information, control information which is specific for the current eye position.

However, because substantial errors in the wave form cannot be prevented technically if the tracking range is large, the spatial light modulator means must realise an extremely large mechanical modulation range if they have the additional task to perform a wave correction. No known high-resolution spatial light modulator has a modulation range which would be sufficient for this. According to this invention, the optical wave correction means therefore contain in addition to the spatial light modulator means, which provide the modulated wave, at least one controllable wave former for wave correction in the optical path of the modulated wave between the hologram and display screen, where said wave former has a lower resolution than the spatial light modulator means, but whose optical behaviour can be controlled locally with a greater modulation range.

According to the invention, the computing means estimate the deviation in the form of a wave which is subject to aberrations, as it is anticipated to occur at the current eye position due to systematic optical errors, on the basis of position information which describe the current eye position and using an internally stored description of the complex transfer function for the optical paths to different eye positions in the entire optical reconstruction system. Based on those deviations in form, the computing means compute correction data, which control the wave forming means such that a wave form which is optimised for holographic reconstruction propagates on the observer side of the display screen towards the current eye position, where said wave form reconstructs the three-dimensional scene at high quality for the eye in the visibility region behind the current eye position.

The controllable wave forming means locally modify on purpose the phase structure of the light wave and errors in the direction of propagation in sub-regions of the wave, thus compensating deformations of the modulated wave, which the directed modulated wave would otherwise have immediately before the reconstruction appears in the reconstruction space. In order to correct optical errors in the field distribution of the modulated light wave, the optical wave forming means are preferably disposed in the plane of an intermediate image of the video holograms.

A major advantage of the invention is that also eye-position-specific deformation can be corrected, without using complex and costly wave sensors for detecting a wave deformation, as used in prior art adaptive optical systems. The information which describes the current eye position supplied by the position controller for optical wave tracking alone is sufficient to be able to compute with the help of software means control information for the optical wave forming means, taking advantage of a stored transfer function of the optical system.

SHORT DESCRIPTION OF FIGURES

The inventive solution will now be explained in more detail with the help of several embodiments and accompanying Figures, wherein:

FIG. 1a: is a top view showing a holographic projection system where the face of an observer defines a first eye position. This system has been described by the applicant in the introductory section of the description above, and it was already disclosed in the international application PCT/DE 2006/000896.

FIG. 1b: shows a projection system with a controllable optical wave tracking means, which directs the optical axis of the holographically modulated wave at a different eye position of the respective observer eye. Again, this system has been described in the introductory section of the description above, and it was already disclosed in the German patent application no. DE 10 2006 024 092.8.

Figure 2:
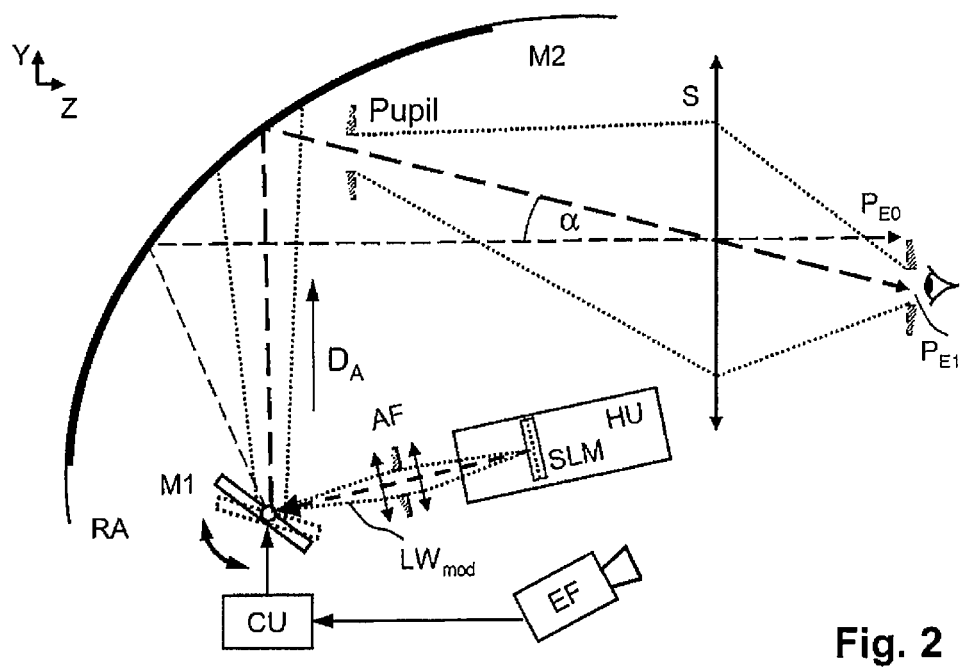

FIG. 2: is a side view showing an improved wave tracking means compared with that shown in FIG. 1b.

Figure 3:
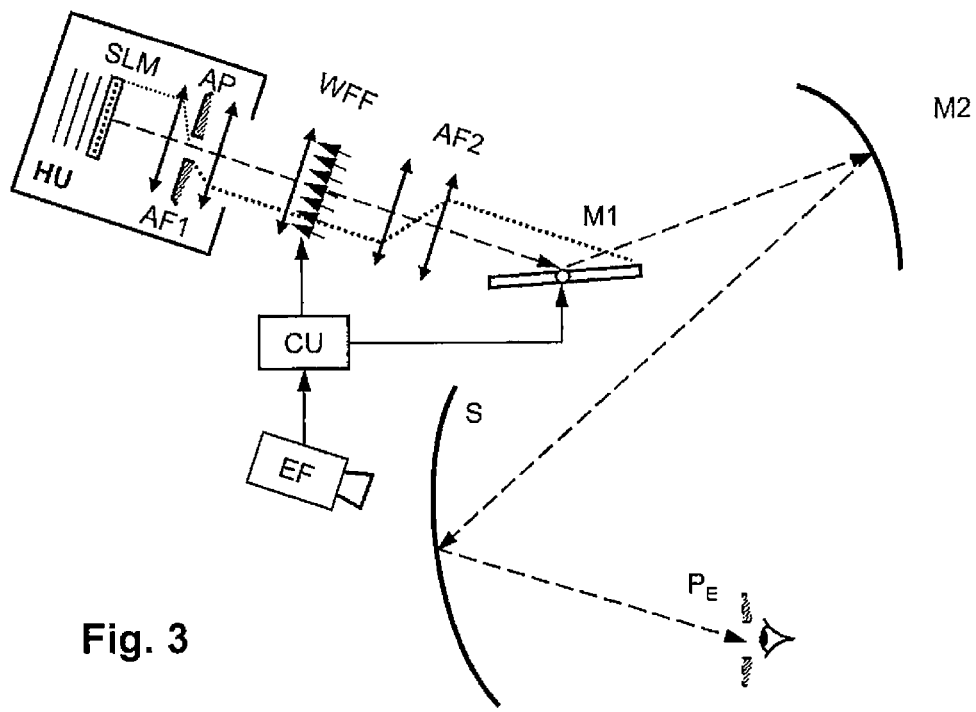

FIG. 3: is a side view which illustrates the general design of a holographic projection system with an optical wave correction means according to the present invention.

Figure 4:
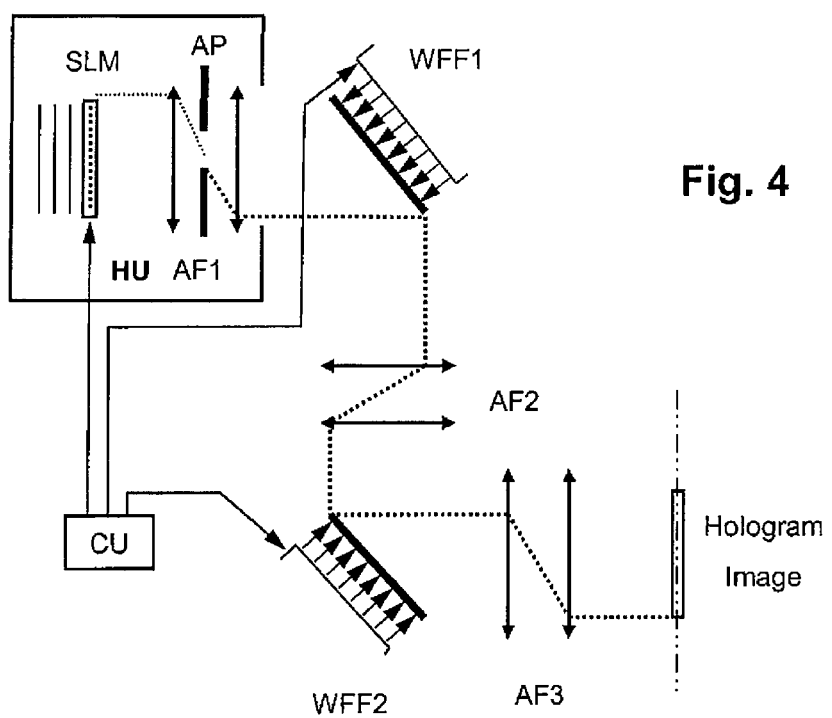

FIG. 4: is a detail of a holographic projection system with a different kind of optical wave correction according to the present invention.

DETAILED DESCRIPTION

In an exemplary embodiment of a projection system with wave correction according to this invention, the projection system provides for each observer at least one reconstruction in a separate virtual reconstruction space that ends at an eye position. For this, the system generates in a time-division and/or space-division multiplexed process for each observer at least one modulated wave, which is directed by a controllable optical wave tracking means through an exit position on the display screen at different eye positions.

The technical problem on which the present invention is based will now be explained with reference to FIG. 2 for clarification:

The projection system comprises a holographic unit HU with a spatial light modulator SLM, said unit being substantially known from the projection system described with reference to FIG. 1a above. The holographic unit HU is followed by an afocal lens system AF. In order to provide a separate reconstruction for each eye position $P_E$, a hologram processor, not shown, encodes in a time-division multiplexed process the spatial light modulator SLM of the unit HU alternately with different video holograms, which correspond to the respective observer eyes, and which differ in parallax by the separation of the observer eyes. A first part of an optical wave tracking means in the form of a tracking mirror M1, which can be turned by any degree in any direction, is disposed in the centre of the modulated light wave $LW_{mod}$, preferably at a position where the afocal lens system AF creates an intermediate image of the video hologram.

In the present application, an afocal lens system is a lens system whose focal lengths are infinite, so that it receives collimated light waves and emits them again in a collimated manner.

The tracking mirror M1 is linked to computing means CU, which comprise a position controller in the embodiment shown in FIG. 2, which controls the inclination of the tracking mirror M1 based on position information which are provided by an eye finder EF. The computing means CU control the inclination of the tracking mirror M1 indirectly depending on the eye position $P_E$ such that it reflects the modulated wave $LW_{mod}$ onto a second part of the optical wave tracking means, which is disposed in a fixed position in the direction of reflection $D_A$.

In contrast to scanning mirrors, the tracking mirror M1 simultaneously reflects all light waves of the modulated wave $LW_{mod}$ which contribute to the interferences in a controllable direction of reflection $D_A$.

The second part is a large, fixed tilted mirror M2 with a reflecting surface RA. A part of the reflecting surface always lies in the optical path of the wave reflected from the tracking mirror M1, irrespective of the actual inclination of the tracking mirror M1, and the reflecting surface redirects the reflected wave at the eye position $P_E$ before the latter leaves the reconstruction system. The position controller thus achieves the same effect merely by changing the inclination of the tracking mirror M1 as would be caused by moving the entire unit HU.

In order to achieve like path lengths for the modulated and redirected wave for all desired eye positions $P_E$, the reflecting surface MA of the tilted mirror M2 is shaped as a segment of an ellipsoid, and the tracking mirror M1 is disposed in one focal point of the ellipsoid, and the centre of the display screen is disposed in the other focal point. Because the tilted mirror M2 is a concave mirror, it images the intermediate image of the filtered video hologram onto the display screen S in an enlarged manner. At the same time, the tilted mirror M2 images the filtered spatial frequency spectrum into the space in front of the display screen S in the form of an intermediate pupil, which is marked with the word 'pupil' in FIG. 2. The position of the intermediate pupil depends on the eye position which is controlled by the wave tracking device. The focussing display screen S images the intermediate pupil as an exit pupil into a visibility region, which corresponds with the eye position $P_{E1}$. The holographic reconstruction appears in the frustum which stretches between the display screen and the eye position $P_{E1}$. FIG. 2 shows that the display screen S images the second intermediate image onto the eye position $P_{E1}$ at a large field angle compared with the perpendicular eye position $P_{E0}$. Because it occurs at a variable field angle, the latter imaging is the ultimate cause of the position-specific deformation of the wave prior to the reconstruction process.

This wave deformation can be corrected with the help of the computer-controlled wave correction according to this invention.

Embodiments

It is of no importance for the following embodiments whether the holographic projection system has a transmissive display screen in the form of a lens, or a reflective display screen in the form of a focussing concave mirror. Both kinds of display screens S cause similar position-specific wave deformations. However, there are additional chromatic aberrations with a transmissive display screen.

A wave is corrected with the help of at least one optical wave former, which can generally be disposed at various positions in the optical path inside the projection system. However, as a major prerequisite, the wave former must be disposed at positions in the optical path where an intermediate image of the spatially filtered video holograms is situated.

A particularly efficient wave correction is achieved at manageable efforts already in front of the first part of the optical wave tracking means. As shown in FIG. 2, the pivoted tracking mirror M1 is the first part of the optical wave tracking means.

FIG. 3 shows such an embodiment of the invention. A sequence of video holograms is encoded on a spatial light modulator SLM which is illuminated by a light wave. An afocal lens system AF1 creates in the modulated light wave a spatial spectrum of the current video hologram, and a spatial frequency filter AP filters one diffraction order out of said spectrum. The afocal lens system AF1 images the filtered diffraction order of the video hologram, hereinafter referred to as the filtered video hologram, into infinite space.

The components described above constitute the holographic unit HU, which is known as such.

According to this invention, an electronically controllable wave former WFF, which serves as a part of the optical wave correction, lies in the intermediate image of the filtered diffraction order of the video hologram, said wave former preferably modifying in sections of the wave the phase over several light wave lengths according to the control values. The wave former WFF discretely changes the phase in individual sections of the modulated front according to a control signal provided by the computing means CU, which according to the embodiment shown in FIG. 3 comprise the position controller and a wave correction controller. In this embodiment again, the computing means CU receive from an eye finder position information which defines the current eye position $P_E$ of an observer eye. Another afocal lens system, AF2, which images the intermediate image modified by the wave former WFF into infinite space, is disposed on the observer side of the wave former WFF in the optical path of the modulated light wave. The tracking mirror M1 is disposed in the optical path of the imaging.

As was explained with reference to FIG. 2, the tracking mirror M1 is the first part of the optical wave tracking means. The remaining part of the projection system shown in FIG. 3 works like the wave tracking means shown in FIG. 2. The tracking mirror M1 reflects the modulated wave modified by the wave former WFF towards the concave elliptic mirror M2, which images the incident parallel, modulated and modified wave in an enlarged manner into the vicinity of the display screen S. Like the tracking mirror M1, the display screen S lies in a focal point of the ellipsoid whose segment represents the reflecting surface of the tilted mirror M2.

The holographic reconstruction appears on the observer side of the display screen S, in front of the eye position $P_E$, in the focal cone of the modulated wave focussed by the display screen S.

According to the invention, the wave former WFF modifies the wave form of the modulated wave already before it is deformed by the optical elements, namely the tilted mirror M2, the display screen S and the tracking mirror M1, if the latter has an non-planar surface. This means that the wave former WFF controls the wave form of the modulated wave such that the wave deformations by the optical elements which follow on the optical path are compensated.

The tracking mirror M1 is linked with the position controller of the computing means CU. It is of no importance to the functionality of the present invention whether or not the position controller and the wave correction controller are implemented on the same computing means. Both the wave former WFF and the tracking mirror M1 use the same data input relating to the current eye position $P_E$, which is supplied by the eye finder EF. However, the calculation of the two different types of control data differs significantly. The position controller in the computing means CU calculates for the wave former WFF position-specific wave form information which describe an adjustment pattern for the generation of a correction wave form for correcting an expected wave deformation. For this, the computing means CU must estimate the expected wave deformation of the uncorrected optical system with the help of the transfer function for the optical system specific to the current eye position. In contrast, the position controller in the computing means CU calculates for the tracking mirror M1 angle data for controlling the inclination of the tracking mirror M1 in the optical wave tracking means, which depend on the parameters of the ellipsoid.

According to a preferred embodiment of the invention, the wave former is at least one controllable mirror, known as such, with electromechanical actuator means, which locally modify the shape of the reflecting surface. In order to prevent the occurrence of additional periodic continuations of the reconstructed object points, the mirror should preferably exhibit a variably controllable, continuous surface shape. This can be achieved for example in that known electromechanical actuators with a large number of individually controllable adjustment positions variably deform a continuous elastic mirror surface so as to achieve a desired shape of the reflector. Such a wave former can realise a much larger phase shift than a high-resolution spatial light modulator SLM, on which the video hologram is encoded. Therefore, and because of the continuous mirror surface, problems with the precise correspondence between the modulator cells of the spatial light modulator SLM and the reflecting surface cannot occur.

Embodiments of the invention where the function of the controllable wave forming means is achieved by several wave formers are can be thought of as well. Then, each wave former must be disposed at the location of an intermediate image. The first, hologram-side wave former is located in the image of the filtered video hologram. If its limited controllable phase dynamics is taken into account, the spatial light modulator SLM can also be used as the first wave former for the modulated wave.

Any further observer-side wave former requires additional imaging means. After being modified by the previous wave former, the image of the video hologram is imaged by those imaging means onto the next wave former.

FIG. 4 shows an embodiment with wave formers WFF1 and WFF2 connected in series. The wave formers WFF1, WFF2 are continuously controllable mirrors. One of them is, for example, a cylindrical mirror which realises form adjustments in the vertical direction only, and the other one is a cylindrical mirror which realises form adjustments in the horizontal direction only. Taking advantage of relatively easily realisable technological solutions, as far as the design of the wave formers is concerned, angle-specific deformations, such as field aberrations, can be compensated. The wave former WFF2 requires the afocal lens system AF2, which images the image of the video hologram onto the wave former WFF2 after being modified by the wave former WFF1. Only the afocal lens system AF3 images the compensated wave onto the wave tracking means, e.g. the tracking mirror M1 (not shown in FIG. 4). Because the wave formers WFF1, WFF2 modify the wave in different directions, and because the spatial light modulator SLM is employed as high-resolution wave former for final corrections, the computing means CU calculate a separate control signal for each wave former. The computing means CU superimpose the control signal for the spatial light modulator SLM on the code of the video hologram sequence.

According to a preferred continuation of the invention, the wave formers WFF1, WFF2 and further wave formers, if any, differ in design, e.g. as regards resolution and/or phase shift. The structural control may differ as well. This allows known wave formers which only allow spherical adjustments to be made, for example, to be disposed in the optical path of the system at locations of intermediate images, while known asymmetrical wave formers, where the computing means change the optical properties differently in the segments, are disposed at locations of other intermediate images.

According to a preferred embodiment of the invention, in an arrangement version of the system which involves several wave formers, the computing means evaluate the calculated correction data, taking into account the resolution in the phase structure and the shift to be realised for phase modulation. As a result of this evaluation process, correction data components at variable portions are assigned to the individual wave formers. A first data set, which comprises a correction wave form characterised by great modulation range and low structural resolution, is assigned to the wave formers WFF1 and WFF2, while a second data set, which comprises a correction wave form characterised by small modulation range and high structural resolution, is superimposed on the spatial light modulator SLM.

According to a further embodiment of the invention, the computing means control at least one wave former such that it tracks the modulated wave by controlling the overall focus of the projection system according to a current eye position. For this, parts of the optical wave correction means comprise at least one spherically controllable mirror whose focal length is variable. The position controller controls the spherically controllable mirror at least partly, in order to adapt the focal length of the system to the actual distance between eye position $P_E$ and display screen S based on information about the current eye position. This way, the position controller can adapt the visibility region of the projection system to the current eye position $P_E$ by way of axial displacement.

According to yet another embodiment of the invention, at least one wave former is supported such that its inclination is variable, in order to be able to track lateral changes in the current eye position. This wave former thus fulfills the function of the tracking mirror M1 in the optical wave tracking means at the same time, which can be omitted as a consequence. Thanks to the possibility of controllably changing its inclination, the wave former can generate separate reconstruction spaces for different eye positions in a time-multiplexed process using a single holographic unit HU. To achieve this, the hologram processor encodes the modulator cells of the spatial light modulator means of the holographic unit HU with a hologram sequence, which alternately contains hologram information which corresponds with the currently served eye position. In order to direct at a certain eye position only that modulated light wave that contains the respective hologram information, the control unit CU must merely move the wave former such that it oscillates between two angular positions in synchronism with the hologram sequence. As a small and light-weight type of wave former is used, this oscillation can be performed at sufficient speed, so that a single holographic unit HU can provide holographic reconstructions for different eye positions in a time-division multiplexed process without flickering.

The invention claimed is:

1. Holographic projection system comprising:
   imaging means for imaging video holograms which are encoded on a spatial light modulator means,
   at least one modulated wave holographically reconstructing a three-dimensional scene on an observer side of a focussing display screen, and
   a position controller using position information of current eye positions for controlling optical wave tracking means, which are disposed on the hologram side in front of the focussing display screen, such that the modulated light wave front of the modulated wave appears at the desired eye position on the observer side, irrespective of any changes in the current eye position; and
   controllable wave forming means for optical wave correction of the form of the modulated wave, said controllable wave forming means being disposed on the hologram side in front of the focussing display screen; and
   computer means controlling the optical behaviour of the wave forming means based on the position information of the current eye position such that the wave forming means compensate aberrations of the focussing display screen, which follows in the direction of wave propagation, and correcting at least phase errors in the light propagation of the modulated wave such that the modulated wave reconstructs the optical appearance of a scene according to the geometry of the original scene which is visible from the current eye position irrespective of the current eye position.

2. Holographic projection system according to claim 1 where the wave forming means comprise at least one separate wave former at a location of an intermediate image of the spatially filtered video holograms.

3. Holographic projection system according to claim 2 where the wave former is at least one controllable mirror with control means for locally modifying the shape of the reflective surface.

4. Holographic projection system according to claim 1 with multiple wave formers, which are disposed at various locations with intermediate images.

5. Holographic projection system according to claim 4 where at least one wave former comprises discretely controllable sections in order to modify parts of the cross-section of the modulated light wave differently.

6. Method for the optical correction of the form of a modulated wave in a holographic projection system according to claim 4, wherein the spatial light modulator means support the function of the wave forming means, in that the computer means encode the spatial light modulator means with hologram values which comprise in addition to the holographic information of the three-dimensional scene control information from the position information of the position control means in order to give each section of a light wave an individual structured correction form for compensation already before the modulated wave is distorted caused by aberrations in the optical system.

7. Method according to claim 6 where the computer means estimate the anticipated form deviation of a wave form which is subject to aberrations, as it will occur at the actual eye position due to aberrations in the optical system, on the basis of position information of the current eye position and using an internally stored description of the complex transfer function of the entire optical reconstruction system of individual optical paths corresponding to different eye positions, and where the computer means calculate correction data for the wave forming means based on those form deviations.

8. Method according to claim 7 where the computer means evaluate the calculated correction data as regards structural resolution and modulation range and provide a first data set, which contains a correction wave form characterised by a great modulation range and low structural resolution, and a second data set, which contains a correction wave form characterised by a small modulation range and high structural resolution, and where the computer means superimpose the second data set the encoding of the spatial light modulator means.

9. Holographic projection system according to claim 1 with multiple wave formers, which can be controlled independently of one another in different dimensions in order to correct at least one of the following: angle-specific errors and field-specific errors.

10. Holographic projection system according to claim 1 where the computer means control the wave forming means such that it corrects the wave form and supports the tracking of the modulated wave with the wave tracking means.

11. Holographic projection system according to claim 10 where the computer means encode the wave forming means such that they adapt focussing means of the system to the distance between the current eye position and the focussing display screen, in addition to correcting the wave form.

12. Holographic projection system according to claim 11 where one wave former is supported such that its inclination is variable, in order to be able to track lateral changes in the current eye position.

13. Holographic projection system according to claim 12 where the wave former lies in the focal point of an elliptic mirror.

* * * * *